US009817459B2

(12) United States Patent
Gonzales et al.

(10) Patent No.: US 9,817,459 B2
(45) Date of Patent: Nov. 14, 2017

(54) PRE-BOOT VIDEO SIGNAL

(71) Applicant: HEWLETT-PACKARD DEVELOPMENT COMPANY, L.P., Houston, TX (US)

(72) Inventors: Daniel Ross Gonzales, Houston, TX (US); Gennadiy Rozenberg, Houston, TX (US); Jhovel Louie L. Lopez, Roseville, CA (US); James Jeffery Schulze, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 53 days.

(21) Appl. No.: 14/736,647

(22) Filed: Jun. 11, 2015

(65) Prior Publication Data

US 2016/0363978 A1 Dec. 15, 2016

(51) Int. Cl.
G06F 15/173 (2006.01)
G06F 1/26 (2006.01)
G06F 3/023 (2006.01)
G06F 3/038 (2013.01)
G06F 11/00 (2006.01)
G09G 5/00 (2006.01)
G06F 3/147 (2006.01)
G06F 9/44 (2006.01)

(52) U.S. Cl.
CPC .............. *G06F 1/266* (2013.01); *G06F 3/023* (2013.01); *G06F 3/038* (2013.01); *G06F 3/147* (2013.01); *G06F 9/4401* (2013.01); *G06F 11/00* (2013.01); *G09G 5/00* (2013.01); *G09G 2370/12* (2013.01); *G09G 2370/24* (2013.01)

(58) Field of Classification Search
CPC .......... G06F 1/266; G06F 3/023; G06F 3/038; G06F 3/147; G06F 9/4401
USPC ....... 320/107; 370/466; 710/72, 62, 300, 67; 726/18; 713/1, 2; 709/208
See application file for complete search history.

(56) References Cited

U.S. PATENT DOCUMENTS

| 8,028,108 | B2* | 9/2011 | Batish | G06F 3/0227 710/72 |
| 8,230,237 | B2 | 7/2012 | Yao et al. | |
| 8,516,162 | B2* | 8/2013 | Chiba | G06F 1/1632 710/11 |
| 2003/0082960 | A1 | 5/2003 | Baker | |
| 2003/0131127 | A1* | 7/2003 | King | G06F 3/023 709/238 |
| 2005/0033815 | A1* | 2/2005 | Nagao | G06F 3/0227 709/208 |
| 2006/0140211 | A1* | 6/2006 | Huang | G06F 1/26 370/466 |

(Continued)

OTHER PUBLICATIONS

Network Technologies, Inc., Unimux-USBV-XHD High Density USB KVM Switch Installation and Operation Manual, (Research Paper), Apr. 7, 2014, 62 Pages.

*Primary Examiner* — Aurel Prifti
(74) *Attorney, Agent, or Firm* — Hewlett Packard Enterprise Patent Department

(57) ABSTRACT

Examples disclosed herein relate to video output instructions to determine whether a pre-boot video signal is to be provided and, in response to determining that the request for the pre-boot video signal has been received, enable power to an auxiliary output and provide the pre-boot video signal to a display device communicatively coupled to the auxiliary output.

14 Claims, 3 Drawing Sheets

(56) References Cited

U.S. PATENT DOCUMENTS

| | | | |
|---|---|---|---|
| 2007/0174526 A1 | 7/2007 | Blackwell et al. | |
| 2007/0208891 A1* | 9/2007 | Liu | G06F 11/2294 710/62 |
| 2008/0270776 A1* | 10/2008 | Totolos | G06F 11/1441 713/1 |
| 2010/0095030 A1* | 4/2010 | Chiu | G06F 3/023 710/67 |
| 2011/0208955 A1* | 8/2011 | Anbazhagan | G06F 9/4401 713/2 |
| 2013/0162198 A1* | 6/2013 | Yokota | H02J 7/007 320/107 |
| 2013/0174250 A1* | 7/2013 | Chen | G06F 21/572 726/18 |
| 2014/0244880 A1* | 8/2014 | Soffer | G06F 3/0227 710/300 |
| 2015/0109535 A1* | 4/2015 | Huang | H04N 21/4432 348/730 |
| 2015/0199201 A1* | 7/2015 | Lim | G06F 11/073 713/2 |
| 2017/0185782 A1* | 6/2017 | Furuya | G06F 21/32 |

\* cited by examiner

PRE-BOOT VIDEO SIGNAL

BACKGROUND

In some situations, computing devices may be connected to a keyboard, video, and mouse (KVM) switch that allows for the control of multiple computing devices with a single set of input/output devices. Such switches may rely on auxiliary power from the computing device, such as via universal serial bus (USB).

BRIEF DESCRIPTION OF THE DRAWINGS

In the accompanying drawings, like numerals refer to like components or blocks. The following detailed description references the drawings, wherein.

DETAILED DESCRIPTION

As described above, a plurality of computing devices, such as servers in a rack, may share input devices such as a keyboard and mouse and display devices, such as monitors, with the use of a keyboard, video and mouse (KVM) switch. The switch may receive power from a standard wall outlet and/or from connections to the computing devices, such as via a universal serial bus (USB) and/or a high-definition multimedia interface (HDMI) cable. In some situations, the KVM may enable video throughput from a selected computing device when certain conditions are met, such as when power is received on USB connections to the computing device. Some computing devices, however, may not enable USB and/or other accessory power until after certain stages of power-on and boot up have been completed, preventing display of pre-boot information.

Figure 1:
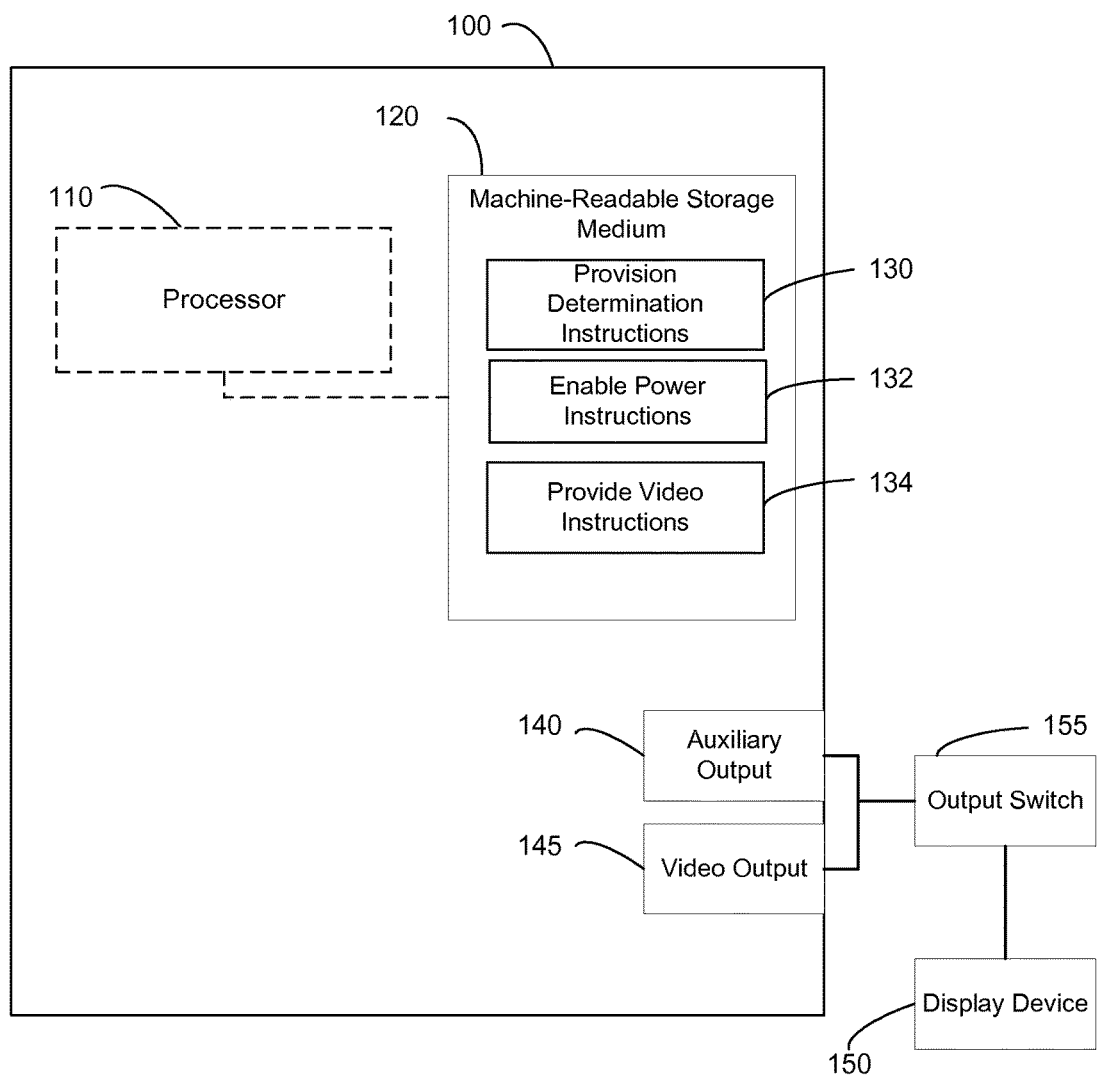
FIG. 1 is a block diagram of an example video output device.

Referring now to the drawings, FIG. 1 is a block diagram of an example video output device 100 consistent with disclosed implementations. Video output device 100 may comprise a processor 110 and a non-transitory machine-readable storage medium 120. Video output device 100 may comprise a computing device such as a server computer, a desktop computer, a laptop computer, a handheld computing device, a smart phone, a tablet computing device, a mobile phone, or the like.

Processor 110 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 120. In particular, processor 110 may fetch, decode, and execute a plurality of provision determination instructions 130, enable power instructions 132, and provide video instructions 134 to implement the functionality described in detail below. Device 100 may further comprise an auxiliary output 140 and a video output 145 coupled to a display device 150 via an output switch 160.

Executable instructions may comprise logic stored in any portion and/or component of machine-readable storage medium 120 and executable by processor 110. The machine-readable storage medium 120 may comprise both volatile and/or nonvolatile memory and data storage components. Volatile components are those that do not retain data values upon loss of power. Nonvolatile components are those that retain data upon a loss of power.

The machine-readable storage medium 120 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Provision determination instructions 130 may determine whether a pre-boot video signal is to be provided. For example, video output device 100 may comprise one of a plurality of servers in a rack coupled to output switch 155. Output switch 155 may be used to select which of the plurality of servers is providing video to display device 150. In some implementations, pre-boot video signal such as diagnostic information and/or start-up test results may be requested for display on display device 150.

In some implementations, the request may comprise a manual request from a user, such as activation of a hardware selector and/or indicator switch. In some implementations, the request may comprise a detection of a trouble condition such as an improper shutdown. In some implementations, the request may comprise a configuration setting associated with the pre-boot video signal, such as a basic input/output system (BIOS) setting indicating that pre-boot video signal should be provided. In some implementations, the request may comprise an identification of a particular hardware component's presence, such as the presence of output switch 155 or newly installed hardware in video output device 100.

Enable power instructions 132 may, in response to determining that pre-boot video signal is to be provided, enable power to an auxiliary output. For example, the auxiliary output, such as a universal serial bus output, may be coupled to a power distribution switch controlled by a complex programmable logic device (CPLD) and/or field-programmable gate array (FPGA) in device 100.

Provide video instructions 134 may cause the pre-boot video signal to be provided to a display device coupled to the auxiliary output via the output switch. For example, the pre-boot video signal may be controlled by a baseboard management controller (BMC) in device 100. To enable both video and USB power simultaneously, handshaking between the BMC and FPGA/CPLD may occur such that the FPGA/CPLD enables power from the power distribution switch to auxiliary output 140 as the BMC begins providing the pre-boot video signal to video output 145. In some implementations, the FPGA/CPLD may instruct the BMC to provide video output 145 once auxiliary output power has been enabled. The auxiliary output power may thereby cause output switch 155 to enable display of the pre-boot video signal on display device 150.

Figure 2:
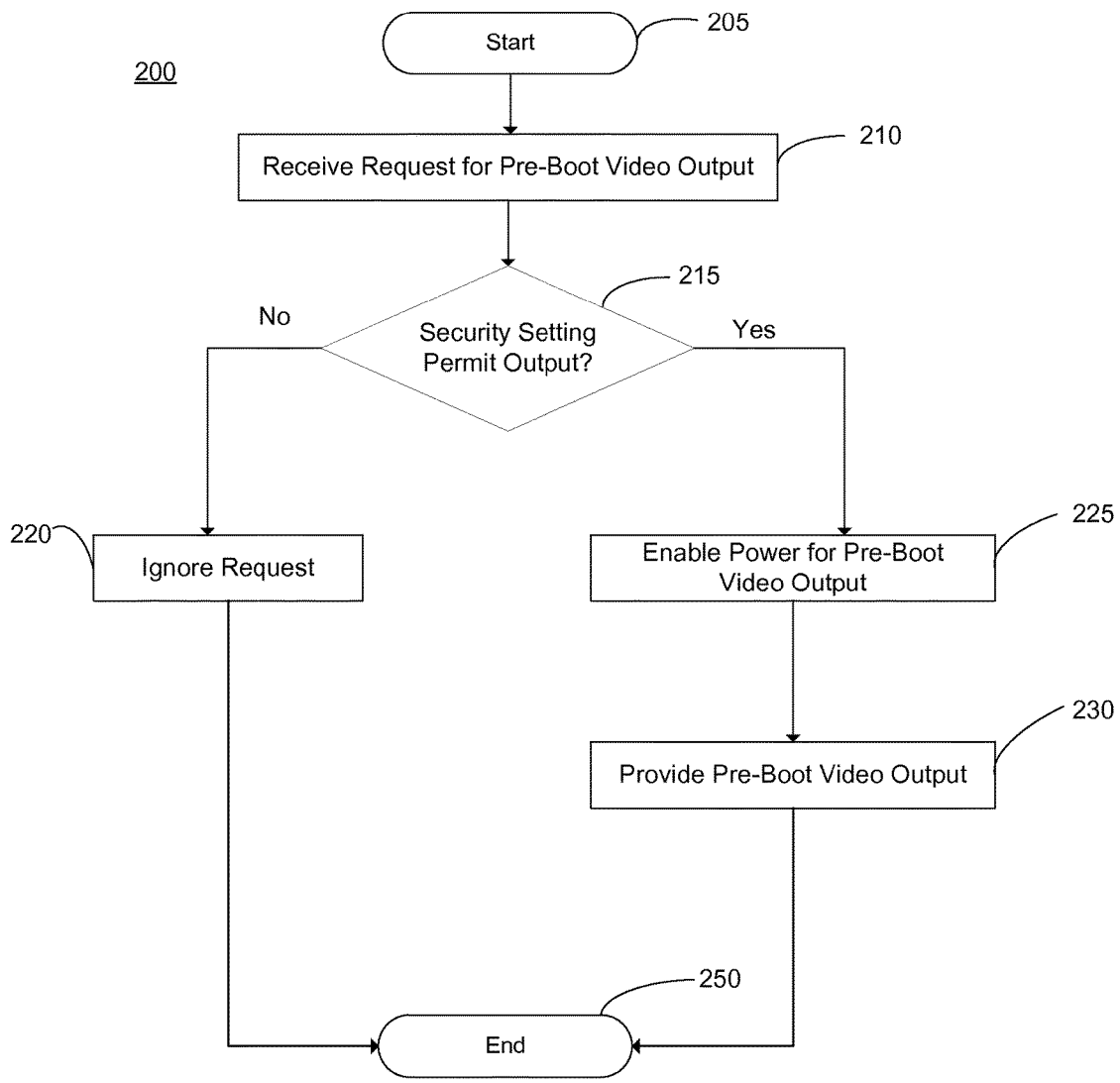
FIG. 2 is a flowchart of an example of a method for video output.

FIG. 2 is a flowchart of a method 200 for video output consistent with disclosed implementations. Although execution of method 200 is described below with reference to the components of video output device 100, other suitable components for execution of method 200 may be used.

Method 200 may begin in stage 205 and proceed to stage 210 where device 100 may receive a request for a pre-boot video signal. For example, video output device 100 may comprise one of a plurality of servers in a rack coupled to output switch 155. Output switch 155 may be used to select which of the plurality of servers is providing video to display device 150. In some implementations, pre-boot video signal such as diagnostic information and/or start-up test results may be requested for display on display device 150.

The request for the pre-boot video signal may comprise a manual request from a user, such as activation of a hardware selector and/or indicator switch. In some implementations, the request may comprise a detection of a trouble condition such as an improper shutdown. In some implementations, the request may comprise a configuration setting associated with the pre-boot video signal, such as a basic input/output system (BIOS) setting indicating that pre-boot video signal should be provided. In some implementations, the request may comprise an identification of a particular hardware component's presence, such as the presence of output switch 155 or newly installed hardware in video output device 100.

Method 200 may then advance to stage 215 where device 100 may determine if a security setting permits a display of the pre-boot video signal. For example, device 100 may be configured with a startup password that prevents display of information unless the password has been entered and/or may require a hardware key/dongle be in place before such information may be displayed.

If the security setting is determined not to permit the display of the pre-boot video signal at stage 215, method 200 may advance to stage 220 where device 100 may ignore the request for the pre-boot video signal. In some implementations, an error message may be displayed, the pre-boot video signal may not be provided, and/or the power to an auxiliary output port may not be provided such that the pre-boot video signal will not be displayed on a monitor or other display device.

Otherwise, method 200 may advance to stage 225 where device 100 may enable power for the pre-boot video signal via a universal serial bus (USB) port coupled to an output switch component. In some implementations, enabling power for the pre-boot video signal may comprise activating a 5 volt power output to the USB port from a power distribution switch. For example, enable power instructions 132 may, in response to determining that pre-boot video signal is to be provided, enable power to an auxiliary output. For example, the auxiliary output may be coupled to a power distribution switch controlled by a complex programmable logic device (CPLD) and/or field-programmable gate array (FPGA) device 100. The CPLD/FPGA may enable an appropriate power flow to the auxiliary output, such as a five volt (5V) output to a USB port.

Method 200 may then advance to stage 230 where device 100 may provide the pre-boot video signal to the output switch component. For example, provide video instructions 134 may provide the pre-boot video signal to a display device communicatively coupled to the auxiliary output. For example, the pre-boot video signal may be controlled by a baseboard management controller (BMC) in device 100. To enable both video and USB power simultaneously, handshaking between the BMC and FPGA/CPLD may occur such that the FPGA/CPLD enables power from the power distribution switch to auxiliary output 140 as the BMC begins providing the pre-boot video signal to video output 145. The auxiliary output power may thereby cause output switch 155 to enable display of the pre-boot video signal on display device 150.

Method 200 may then end at stage 250.

Figure 3:
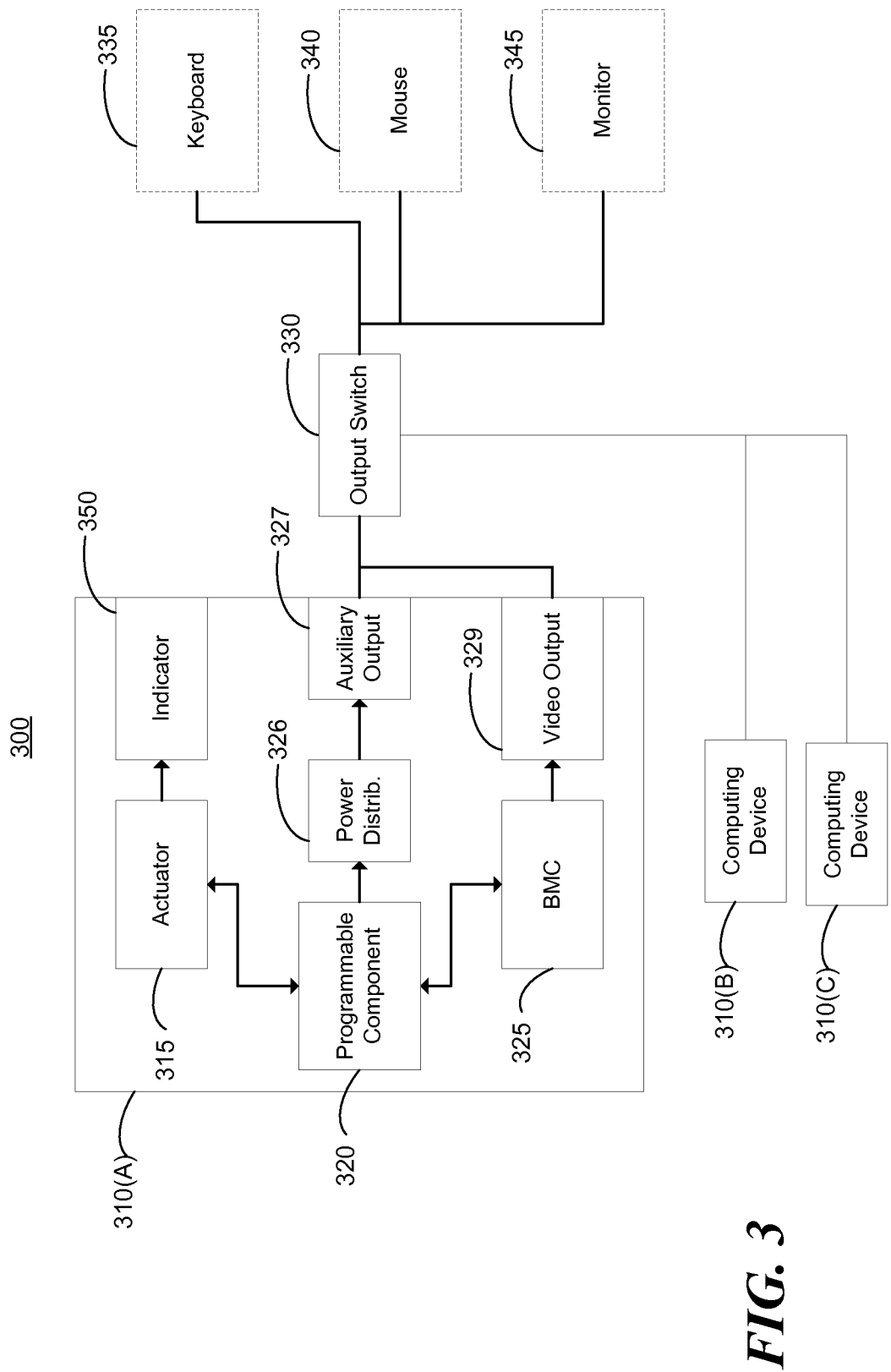
FIG. 3 is a block diagram of an example system for video output.

FIG. 3 is a block diagram of a system 300 for video output. System 300 may comprise a plurality of computing devices 310(A)-(C). Each of computing devices 310(A)-(C) may comprise an actuator 315, a programmable component 320, a baseboard management controller (BMC) 325, a power distribution switch 326, an auxiliary output 327 and a video output 329. System 300 may further comprise an output switch 330 coupled to a keyboard 335, a mouse (or other pointing device, such as a touchscreen controller) 340, and a monitor 345. The keyboard 335, mouse 340, and monitor 345 are shown for clarity; output switches coupled to other types of input/output devices may also be used. In some implementations, devices 310(A)-(C) may comprise an indicator 350, such as an LED and/or other distinguishing component that may display an indication that the pre-boot video signal is available and/or being provided.

Computing device 310 may comprise, for example, a general and/or special purpose computer, server, mainframe, desktop, laptop, tablet, smart phone, game console, and/or any other system capable of providing computing capability consistent with providing the implementations described herein.

Computing device 310 may comprise any combination of hardware and programming to implement the functionalities of the respective components. In examples described herein, such combinations of hardware and programming may be implemented in a number of different ways. For example, programming may comprise processor executable instructions stored on a non-transitory machine-readable storage medium and the hardware for the engines may include a processing resource to execute those instructions.

Actuator 315 may comprise a physical and/or "soft" switch accessible to a user of device 310(A). Selection, activation, toggling, etc. of actuator 315 may indicate a request for display of a pre-boot video signal. In some implementations, the request may comprise a manual request from a user, such as activation of a actuator 315. In some implementations, the request may comprise a detection of a trouble condition such as an improper shutdown. In some implementations, the request may comprise a configuration setting associated with the pre-boot video signal, such as a basic input/output system (BIOS) setting indicating that pre-boot video signal should be provided. In some implementations, the request may comprise an identification of a particular hardware component's presence, such as the presence of output switch 330 or newly installed hardware in device 310(A)-(C).

BMC 325 may provide the pre-boot video signal comprising a plurality of diagnostic information to a video output port. In some implementations, the video signal may be provided to video output port 329 regardless of whether a request for the video signal has been received or not. Output switch 330 may not relay the pre-boot video signal to monitor 345, however, unless power is also received from auxiliary output 327.

Power distribution switch 326 may control power to a plurality of accessory ports comprising at least one universal serial bus (USB) port. For example, power distribution switch 326 may comprise a transformer and/or relay between a power supply and various components in device 310(A) including auxiliary output 327. Power distribution switch may provide specific power levels to each component, such as five volts (5V) to a USB port or fan controller or twelve volts (12V) to a hard disk drive.

Programmable component 320 may comprise, for example, a complex programmable logic device (CPLD) and/or field-programmable gate array (FPGA). Component 320 may comprise re-programmable instructions for when and/or how much power to supply to other components of device 310(A). Component 320 may receive the request for display of a pre-boot video signal from actuator 315, instruct BMC 325 to provide the pre-boot video signal to video output port 329, and cause power distribution switch 326 to provide power to auxiliary port 327.

In some implementations, component 320 may comprise provision determination instructions 130 that may determine whether a pre-boot video signal is to be provided. For example, devices 310(A)-(C) may comprise a plurality of servers in a rack coupled to output switch 330. Output switch 330 may be used to select which of device 310(A)-(C) is providing video to monitor 345. In some implementations, pre-boot video signal such as diagnostic information and/or start-up test results may be requested for display on monitor 345, such as by selection of actuator 315.

The disclosed examples may include systems, devices, computer-readable storage media, and methods for video output. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions for logic to:
   determine whether a pre-boot video signal is to be provided and identify a configuration setting associated with the pre-boot video signal, wherein the configuration setting comprises a basic input/output system (BIOS) setting indicating that the pre-boot video signal should be provided; and
   in response to determining that the request for the pre-boot video signal has been received:
      enable power to an auxiliary output coupled to an output switch, and
      cause the pre-boot video signal to be provided to a display device coupled to the auxiliary output via the output switch.

2. The non-transitory machine-readable medium of claim 1, wherein the instructions to determine whether a pre-boot video signal is to be provided comprise instructions to detect a trouble condition, wherein the trouble condition comprises an improper shutdown.

3. The non-transitory machine-readable medium of claim 1, wherein the instructions to determine whether a pre-boot video signal is to be provided comprise instructions to receive an activation of a hardware selector.

4. The non-transitory machine-readable medium of claim 1, wherein the instructions to determine whether a pre-boot video signal is to be provided comprise instructions to identify a presence of a hardware component, wherein the hardware component comprises at least one of: the output switch or newly installed hardware.

5. The non-transitory machine-readable medium of claim 1, wherein the auxiliary output comprises a universal serial bus port.

6. The non-transitory machine-readable medium of claim 5, wherein the universal serial bus port is connected to an output switch.

7. A computer-implemented method, comprising:
   receiving a request for a pre-boot video signal by a programmable component responsive to a detected trouble condition, wherein the trouble condition comprises an improper shutdown;
   enabling power, by the programmable component, for an output switch component via a universal serial bus port coupled to the output switch component; and
   providing the pre-boot video signal to the output switch component.

8. The computer-implemented method of claim 7, wherein the programmable component is coupled to a baseboard management controller to provide the pre-boot video signal to the output switch component.

9. The computer-implemented method of claim 8, wherein the programmable component enables power for the output switch component in response to a video activation signal from the baseboard management controller.

10. The computer-implemented method of claim 7, further comprising:
    determining if a security setting permits a display of the pre-boot video signal; and
    in response to determining that the security setting does not permit the display of the pre-boot video signal, ignoring the request for the pre-boot video signal.

11. The computer-implemented method of claim 7, wherein the output switch component comprises a keyboard, video, and mouse (KVM) switch.

12. The computer implemented method of claim 7, wherein enabling power for the pre-boot video signal comprises activating a 5 volt power output from a power distribution switch.

13. A system for video output, comprising:
    an actuator to:
       indicate a request for display of a pre-boot video signal responsive to detecting a trouble condition comprising an improper shutdown;
    a baseboard management controller (BMC) to:
       provide the pre-boot video signal comprising a plurality of diagnostic information to a video output port;
    a power distribution switch to:
       control power to a plurality of accessory ports comprising at least one universal serial bus (USB) port;

a programmable component to:
    receive the request for display of a pre-boot video signal,
    instruct the BMC to provide the pre-boot video signal, and
    cause the power distribution switch to provide a 5-volt power output to the at least one USB port.

14. The system of claim 13, further comprising:
an indicator light to:
    display an indication that the pre-boot video signal is being provided, the indication comprising a light emitting diode (LED) that indicates the pre-boot signal is being provided.

* * * * *